United States Patent
Bettencourt-Silva et al.

(10) Patent No.: US 11,868,729 B2
(45) Date of Patent: Jan. 9, 2024

(54) ANALYZING AND EXPLAINING A TEMPORAL EVOLUTION OF POLICIES AND SUGGESTING NEXT STEPS

(71) Applicant: International Business Machines Corporation, Armonk, NY (US)

(72) Inventors: Joao H Bettencourt-Silva, Dublin (IE); Natalia Mulligan, Dublin (IE); Marco Luca Sbodio, Castaheany (IE); Vanessa Lopez Garcia, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 17/136,872

(22) Filed: Dec. 29, 2020

(65) Prior Publication Data

US 2022/0207241 A1  Jun. 30, 2022

(51) Int. Cl.
| | |
|---|---|
| G06F 40/30 | (2020.01) |
| G06N 20/00 | (2019.01) |
| G06N 5/045 | (2023.01) |
| G06F 16/906 | (2019.01) |
| G06Q 50/26 | (2012.01) |

(52) U.S. Cl.
CPC ............ *G06F 40/30* (2020.01); *G06F 16/906* (2019.01); *G06N 5/045* (2013.01); *G06N 20/00* (2019.01); *G06Q 50/26* (2013.01)

(58) Field of Classification Search
CPC ....... G06F 40/30; G06F 16/906; G06N 20/00; G06N 5/045; G06Q 50/26
See application file for complete search history.

(56) References Cited

U.S. PATENT DOCUMENTS

| | | | |
|---|---|---|---|
| 6,167,398 A | 12/2000 | Wyard et al. | |
| 6,560,620 B1 | 5/2003 | Ching | |
| 7,113,943 B2 | 9/2006 | Bradford et al. | |
| 8,020,191 B2 | 9/2011 | Bertino et al. | |

(Continued)

OTHER PUBLICATIONS

Steban et al.; "Predicting The C-Evolution Of Event And Knowledge Graphs", 19th Fusion IEEE International Conference On, pp. 1-8, Jul. 5-8, 2016.

(Continued)

*Primary Examiner* — Mohammad K Islam
(74) *Attorney, Agent, or Firm* — Scully, Scott, Murphy & Presser, P.C.; Kurt P. Goudy

(57) ABSTRACT

A system and method for analyzing and explaining the temporal evolution of policies. The analysis of the temporal evolution of policies includes determining semantically related changes in the text of the corresponding policies over time and across the different versions of the (two or more) policy documents. An explanation of the temporal evolution of policies is provided consisting of human interpretable information relating each change to one or more events and/or contextual data. A next steps policy change is also suggested that includes a set of policy conditions based on potential future changes of similar policies and contextual data and event data. The suggestions are related to the policy relevant to the target cohort or individual. The system adapts machine learned models by receiving user feedback provided on an analysis of the correctness of the temporal evolution of policies, corresponding explanations and suggestions of the next actions.

20 Claims, 11 Drawing Sheets

(56) References Cited

U.S. PATENT DOCUMENTS

| | | | |
|---|---|---|---|
| 8,121,877 B2 | 2/2012 | Chang et al. | |
| 8,606,724 B2 | 12/2013 | Cheng et al. | |
| 8,655,824 B1 | 2/2014 | Allen et al. | |
| 8,719,063 B1* | 5/2014 | Wade | G06Q 40/08 |
| | | | 705/4 |
| 9,053,367 B2 | 6/2015 | Xiao et al. | |
| 9,514,103 B2 | 12/2016 | Kletter | |
| 9,603,080 B2 | 3/2017 | Siddam | |
| 9,626,081 B2* | 4/2017 | Blanco | G06F 16/2423 |
| 10,255,096 B2 | 4/2019 | Cropper et al. | |
| 10,482,536 B1* | 11/2019 | Doyle | G06Q 40/08 |
| 10,510,120 B1* | 12/2019 | Roll | G06Q 40/08 |
| 10,536,486 B2 | 1/2020 | Nair et al. | |
| 10,693,911 B2 | 6/2020 | Burke et al. | |
| 10,817,949 B1* | 10/2020 | Wieduwilt | G16H 50/30 |
| 11,182,280 B2* | 11/2021 | Slivkins | G06F 11/3438 |
| 11,615,493 B2* | 3/2023 | Mulligan | G06N 20/00 |
| | | | 705/4 |
| 2012/0029951 A1* | 2/2012 | Baluta | G06Q 40/02 |
| | | | 705/4 |
| 2016/0328457 A1 | 11/2016 | Cooper | |
| 2019/0334952 A1 | 10/2019 | Dhoble et al. | |
| 2019/0370399 A1 | 12/2019 | Helander et al. | |
| 2020/0012648 A1 | 1/2020 | Fink | |
| 2021/0271718 A1* | 9/2021 | Agarwal | G06F 16/2474 |
| 2023/0237399 A1* | 7/2023 | Hoang | G06Q 10/06315 |
| | | | 704/9 |

OTHER PUBLICATIONS

Bach et al.; "Time Curves: Folding Time To Visualize Patterns Of Temporal Evolution In Data", TVCG IEEE Transactions On, vol. 22, Issue 1, pp. 559-568, Jan. 31, 2016.

Rezazadegan et al.; "On Encoding Temporal Evolution For Real-Time Action Prediction", International Journal Of Computer Vision, pp. 1-7, May 8, 2018.

Tasnim et al.; "Summarizing Entity Temporal Evolution In Knowledge Graphs", MEPDaW'19 IW3C2 ACM Conference On, pp. 961-965, May 13-17, 2019.

Massimiliano, Dal Mas; "Ontology Temporal Evolution For Multi-Entity Bayesian . . . Updating", Cornell University Library, arXiv:1009.2084v1, pp. 1-20, Sep. 2010.

* cited by examiner

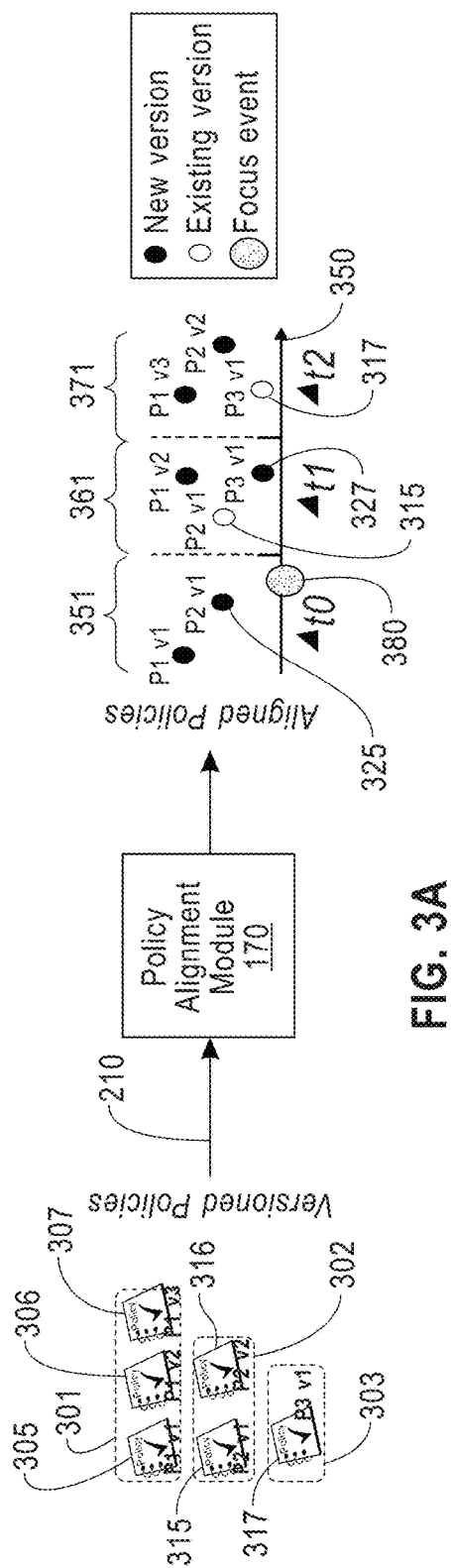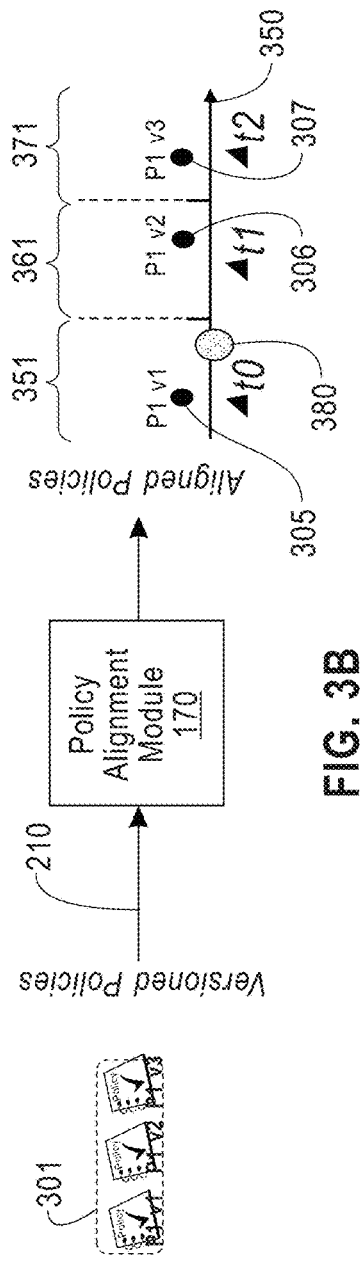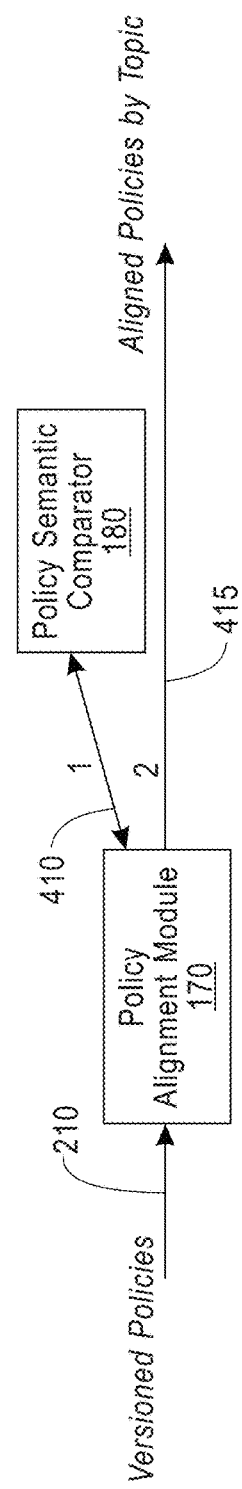
FIG. 3A
FIG. 3B
FIG. 4

US 11,868,729 B2

ANALYZING AND EXPLAINING A TEMPORAL EVOLUTION OF POLICIES AND SUGGESTING NEXT STEPS

FIELD

The present invention relates to applications of Natural Language Processing and Machine Learned models for solving a problem of contextually and semantically understanding legislation changes and the evolution of policies over time to adapt to current external events.

BACKGROUND

Generally, policies are textual documents describing principles to guide decisions and achieve outcomes. Such principles can usually be described in the form of business rules. Examples of policies include car insurance policies, home insurance policies, private health policies, public/state health policies describing coverage and eligibility criteria for its beneficiaries, financials compliance regulations, etc.

A change in a regulation may lead to an updated version of an existent policy, or new bills that replace previous legislation. Often changes in a state policy are published in the form of bulletins describing the amendments done in some of the text or sections in a policy.

Systematic comparison on large policy documents, and in particular, understanding the changes on policy and implications is inherently difficult and time consuming. The regulation and criteria described and the changes in response to an even may vary greatly across local government, and policies in other states, even if for the same service.

SUMMARY

The following summary is merely intended to be exemplary. The summary is not intended to limit the scope of the claims.

According to an aspect, the present disclosure provides for a system and a method for rapidly and automatically suggesting legislative or regulatory policy changes across multiple dimensions.

The system and method for suggesting policy changes and generating rapid changes in legislation responsive to external events, targets the problem of contextually and semantically understanding legislation changes and the evolution of policies over time to adapt to external events, such as a lockdown or limited gathering law resulting from a public health emergency, e.g., a pandemic (Covid, SARS), a natural disaster (such as a hurricane, tsunami, or earthquake) etc., that can impact an entity, e.g., an individual, cohort or a whole population.

In an embodiment, the method and system supports stakeholders such as service providers, policy makers, and insurers (payers) beneficiaries, in: evaluating response (changes) during the preparedness, response and recovery phases including post-crisis follow up and analysis.

According to an aspect, there is provided a computer-implemented method of automatically generating policy for governing an entity. The method comprises: receiving, by a hardware processor, textual content associated with one or more policies over a period of time, the one or more policies comprising different versions of a policy governing an individual or cohort type over the time period; comparing, by the hardware processor, text content of at least two policy versions over a given time frame; determining, by the hardware processor, based on the comparing, semantic differences between the text content of the at least two policy versions that amount to changes of the at least two policy versions over the period of time; receiving, by the hardware processor, one or more focus events effecting the individual or cohort type over the given period of time; determining, by the hardware processor, based on the semantic differences, a causal link explaining a reason for the changes between the at least two policy versions in the context of a focus event; and presenting, by the hardware processor, an explanation or reason for the changes via a user interface device.

According to one aspect, there is provided a computer-implemented system for automatically generating policy for governing an entity. The system comprises: a memory storage device for storing a computer-readable program, and at least one processor adapted to run said computer-readable program to configure the at least one processor to: receive textual content associated with one or more policies over a period of time, the one or more policies comprising different versions of a policy governing an individual or cohort type over the time period; compare text content of at least two policy versions over a given time frame; determine, based on said comparing, semantic differences between said text content of said at least two policy versions that amount to changes of said at least two policy versions over the period of time; receive one or more focus events effecting the individual or cohort type over the given period of time; determine based on said semantic differences, a causal link explaining a reason for the changes between the at least two policy versions in the context of a focus event; and present an explanation or reason for the changes via a user interface device.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

The foregoing aspects and other features are explained in the following description, taken in connection with the accompanying drawings, wherein:

FIG. 3A shows an example application of the policy alignment module when aligning several policies according to an embodiment;

FIG. 3B shows an example application of the policy alignment module when comparing changes/evolution of the same policy according to an embodiment;

FIG. 4 depicts policy alignment module obtaining a semantic comparison of versions for each policy separately (from Policy Semantic Comparator module) for purposes of aligning according to an embodiment;

DETAILED DESCRIPTION

According to an embodiment, the present disclosure provides for a system and a method for rapidly and automatically suggesting legislative policy changes, regulatory policy changes, or other policies/guideline changes of a particular domain across multiple dimensions. The system and method targets the problem of contextually and semantically understanding legislation/regulatory/guideline policy changes and the evolution of such policies over time to adapt to external events, such as a lockdown or limited gathering law resulting from a pandemic (Covid, SARS), a natural disaster (such as a hurricane, tsunami, or earthquake etc.) that can impact a population.

For example, in response to external events such as a case of a public health emergency (such as a lockdown engendered by a pandemic or Covid-19 situation or opioid use disorder crisis) rapid changes in legislation is generated or suggested, for instance in response to how care is delivered (devices, tele-medicine), relaxed medical policy requirements, changes on social services program payments, generation of daily corpus updates globally, etc.

In an embodiment, the method and system supports stakeholders such as service providers, policy makers, and insurers (payers) beneficiaries, in: evaluating response (changes) during the preparedness, response and recovery phases including post-crisis follow up and analysis.

In an embodiment, data processing modules of a computer system compare policies over a given time, identify and explain the changes in the given context of an external event.

In an embodiment, the data processing modules of the computer system compares the evolution of one policy or multiple policies (e.g., comparing updates on policies across two different states since the introduction of a new act) and supports for stakeholders the planning of the next steps or actions to take based on that comparison.

Figure 1:
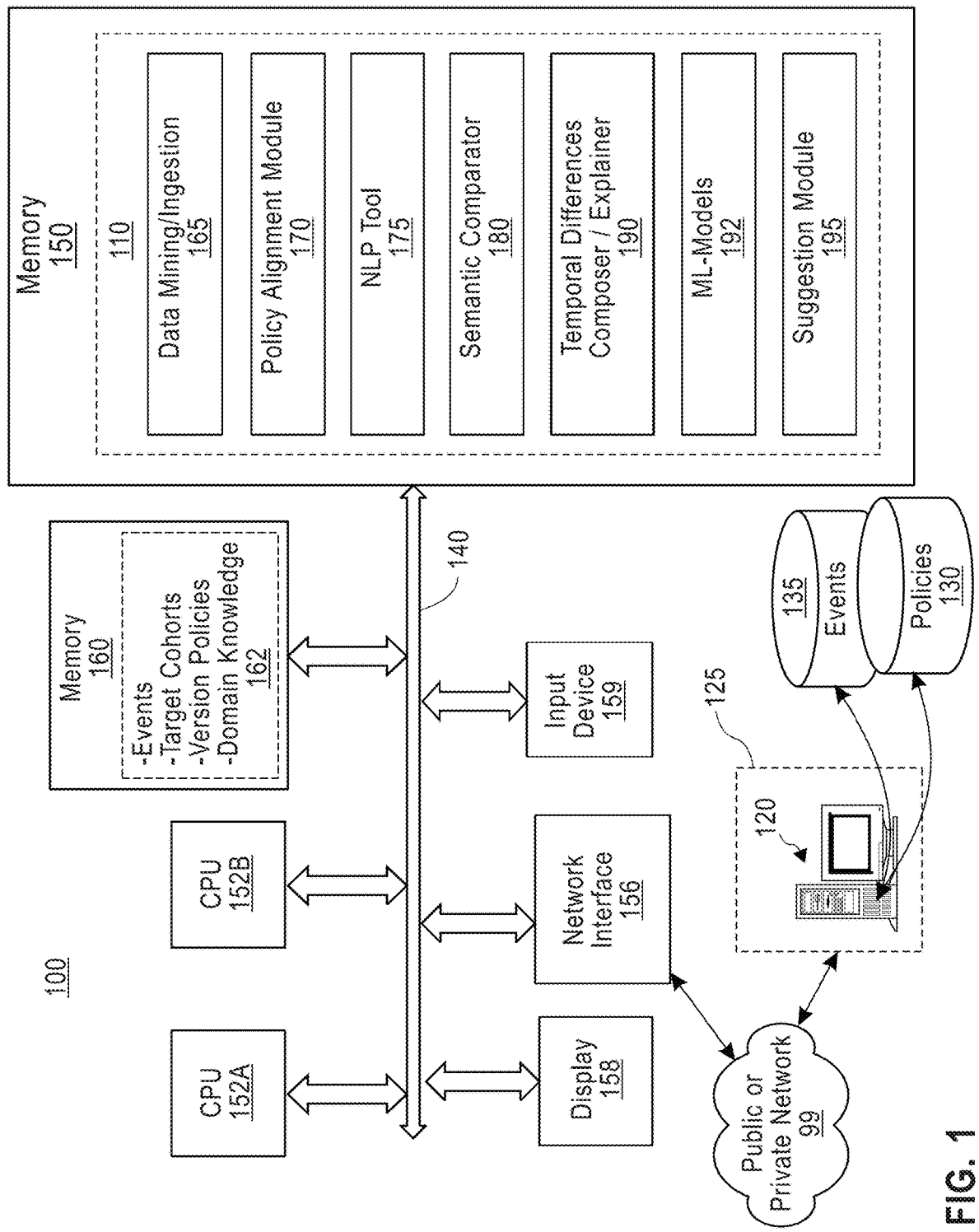
FIG. 1 schematically shows an exemplary computer system which is applicable to implement the embodiments for automatically suggesting legislative, regulatory or guideline policy changes across multiple dimensions according to embodiments of the present invention.

As shown in FIG. 1, in the context of automatically suggesting legislative or policy changes across multiple dimensions according to one embodiment, a tool 100 implementing systems and methods to analyze and explain the temporal evolution of policies, is a computer system, a computing device, a mobile device, or a server. In some aspects, computing device 100 may include, for example, personal computers, laptops, tablets, smart devices, smart phones, or any other similar computing device.

Computing system 100 includes one or more hardware processors 152A, 152B, a memory 150, e.g., for storing an operating system, application program interfaces (APIs) and program instructions, a network interface 156, a display device 158, an input device 159, and any other features common to a computing device. In some aspects, computing system 100 may, for example, be any computing device that is configured to communicate with one or more web-sites 125 including a web- or cloud-based server 120 over a public or private communications network 99. For instance, a web-site may include text of current and past (historical) legislative policies, e.g., including different versions of legislative policies relating to a particular domain, e.g., healthcare, social services, insurance, national research policies, energy, environment, education. These current and past legislative policies can relate to those promulgated by a government or agency of a particular entity or jurisdiction including but not limited to: countries, provinces, states, cities, counties, towns, municipalities, at all levels. The current and past legislative policies may be structured/unstructured electronic-based textual documents that may be accessed from a pre-determined institution that records/stores such policy and law/legal information over an Internet-based connection. Each current and past legislative policy may include a time-stamp or time indication of when it issued and/or indication that it is a changed version or next iteration of the particular policy or rule. Such structured/unstructured electronic-based textual documents may be stored in a policy or rule database 130.

Further, the computing device may further access via a web- or cloud-based server 120, electronic documents or text, e.g., electronic document/newspaper article repositories, knowledgebases, 135, etc., relating to events that have impacted a particular area or particular jurisdiction, e.g., events that impact the world, or specifically have occurred within or have impacted in any meaningful way a particular country, province, state, city, county, town, municipality, at all governmental level. Such meaningful impact refers to an ability of an occurred event or combination of events to impact a target population such as to have engendered a change in a particular policy or rule of law governing that population in a particular domain in a particular area or jurisdiction.

Further, as shown as part of system 100, there is provided a local memory useful for a data processing framework which may include an attached memory storage device 160, or a remote memory storage device, e.g., a database, a lexical database, an ontology, accessible via a remote network connection for input to the system 100.

In the embodiment depicted in FIG. 1, processors 152A, 152B may include, for example, a microcontroller, Field Programmable Gate Array (FPGA), or any other processor that is configured to perform various operations. Additionally shown are the communication channels 140, e.g., wired connections such as data bus lines, address bus lines, Input/Output (I/O) data lines, video bus, expansion busses, etc., for routing signals between the various components of system 100. Processors 152A, 152B are configured to execute method instructions as described below. These instructions may be stored, for example, as programmed modules in a further associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100. In an embodiment, through the user interface, the user can enter specific text versions of policies to be semantically compared, enter a target entity such as an individual user/cohort (e.g., an elderly population over 60 years old) or a whole population impacted by the policies, and/or enter a focus event(s), e.g., a time occurrence of a pandemic that may have engendered a policy change.

With respect to configuring the computer system as an analysis and explanatory tool for detecting the temporal evolution of policies, the local or remote memory 160 may be configured for temporarily storing or using text data or information 162 including, but not limited to: specific events, target entity (user/cohorts/populations), policy versions, and other domain knowledge or context data captured from the web server(s).

These data is stored as a database and accessed for use in conducting the analysis and explanation of a temporal evolution of policies in a particular domain, e.g., healthcare, social services, insurance, banking, etc.

The captured data 162 can be data mined from information stored in the electronic databases 130, 135 or other data sources (not shown). This data may alternately be stored in a separate local memory storage device attached to the computer system 100.

As shown in FIG. 1, memory 150 of computer system 100 further stores processing modules that include programmed instructions adapted to configure the tool to provide an analysis and explanation of a detected temporal evolution of policies for stakeholders (e.g., providers, policy makers, beneficiaries).

In one embodiment, one of the programmed processing modules stored at the associated memory 150 include a data mining/ingestion module 165 that provide instructions and logic for operating circuitry to access/read large amounts of data (e.g., structured or unstructured policy text documents, policy versions data, and other domain knowledge or context data captured, from databases, lexical databases, ontologies, and the like) and rendering them in a form for use by other modules that process the data according to the embodiments of the invention. The domain knowledge data or context data for use in understanding what the policy is about is further extracted and used as input for semantic comparison. Such context can include, for example, a benefit, a restriction, a population, a characteristic (e.g., demographic such as gender, age, race, income) or user profile of individuals in the population/cohort, target user/cohorts data, an economy metric, a statistical data about a cohort or population, a relevant time period, or other variables mentioned in the policy for purposes of presentation and semantic comparison.

In an embodiment, a policy alignment module 170 provides instructions and logic for operating circuitry to receive input text content relating to policies and versions thereof for a relevant time period, compare the extracted text content and align versions of the policies to be compared for evolution determination. In an example embodiment, promulgated policies may not be aligned and happen at different times. Such alignment can involve finding such policies timestamps at the different times and aligning them temporally. For example, state legislative bodies publish bulletins however do not necessarily publish policy updates, amendments or changes at the same time, i.e., one state may implement a change within a delta time interval t1 and another state may publish a change to a similar policy at a next delta time interval t2 (e.g., 2 months later).

In an embodiment, another programmed processing module stored at the associated memory 150 of system tool 100 includes a Natural Language Processing (NLP) tool 175 to implement operations for analyzing textual, natural language data for use by the other system components. For example, alignment module 170 invokes the NLP tool 175 for determining, from the textual content of different policies stored in a database(s) of a particular domain from one or more jurisdictions, each version(s) of a particular policy and its(their) relevant issuance timestamp, and aligning them temporally. The extracted text of policies and versions thereof are associated along a time dimension and pairs or triplets of policies, for example, any number of policies to be compared over a certain time period, are obtained for the given time periods for comparison purposes. A semantic analysis of the text extracted from each policy can be used to determine a similarity of the policies for alignment and semantic comparison purposes.

Another programmed processing module stored at the associated memory 150 of system tool 100 include a Semantic Comparator 180 employing logic and instructions for operating circuitry to compare the semantics of given policy conditions for a target cohort or an individual based on contextual data. Module 180 in particular compares the conditions of the policies based on the semantics of the corresponding texts. The semantic comparing is focused on the conditions that are relevant for a target entity (e.g., population, cohort or an individual), based on using and understanding contextual data. In an embodiment, the contextual data consists of features describing the target entity (e.g., population, cohort or the individual); such features describing may be collected from a variety of data sources including historical claim data, census data, personal profiles, medical/healthcare records, claims, etc. With this additional contextual information, the features can be mined that can navigate the semantic comparison, i.e., who is user being targeted, and understand the semantics of the policy/version for the target group/user for purposes of comparison.

In one embodiment the policy semantic comparator module 180 may be implemented as specified in commonly-owned, co-pending U.S. patent application Ser. No. _____ entitled "A method/system to contextually compare the semantics of policies conditions for a target cohort or an individual" the whole content and disclosure of which is incorporated by reference as if fully set forth herein.

Another processing module stored at the associated computer memory 150 includes a temporal differences composer/explainer module 190 employing logic and instructions for operating circuitry using NLP and machine learned models to infer the link and causality of the changes in policy(ies) in time (between identified delta time intervals t0-t3) based on the events happened around the time of change. The events may be user-specified "focus events" if provided as an input.

Another programmed processing module stored at the associated memory 150 of system tool 100 employs instructions to configure the system to build and run supervised (or unsupervised) machine learning (ML) models 192 for use by the other system components. For example, explainer module 190 invokes both NLP tool 175 and a machine learned model for learning differences and/or explanations for different policy changes of one or more policies. The machine learned models 192 can include, but are not limited to: regression models, knowledge graphs, or neural networks. One of the ML models, can be trained to provide causality explanations or suggestion next action suggestions, based on trained examples that have found a linking of policy changes with respective events or focus events. In an embodiment, supervised learning (classification) techniques using a regression model are used to predict a causality (explanation) of a policy change difference or a next action suggestion associated with an occurrence of a particular event or event type, and/or unsupervised learning (clustering) techniques.

As further shown in FIG. 1, memory 150 includes a supervisory program 110 having instructions for configuring the computing system 100 to call each of the program modules and invoke operations of the analysis and explanatory tool 100 of the temporal evolution of policies described herein. In an embodiment, such supervisory program 110 calls methods and provides application program interfaces for inputting and aligning of policies, the determining of identified policy changes, the obtaining of context or domain knowledge for a target individual group or cohorts subject of the policies, the building and updating of causality models for linking, using the trained models, policy changes to occurrence of external events and to suggest a next policy change or next action suggestion for a stakeholder. At least one application program interface is invoked to receive input data from a user, e.g., a focus event specification while conducting an analysis of particular policies.

Figure 2A:
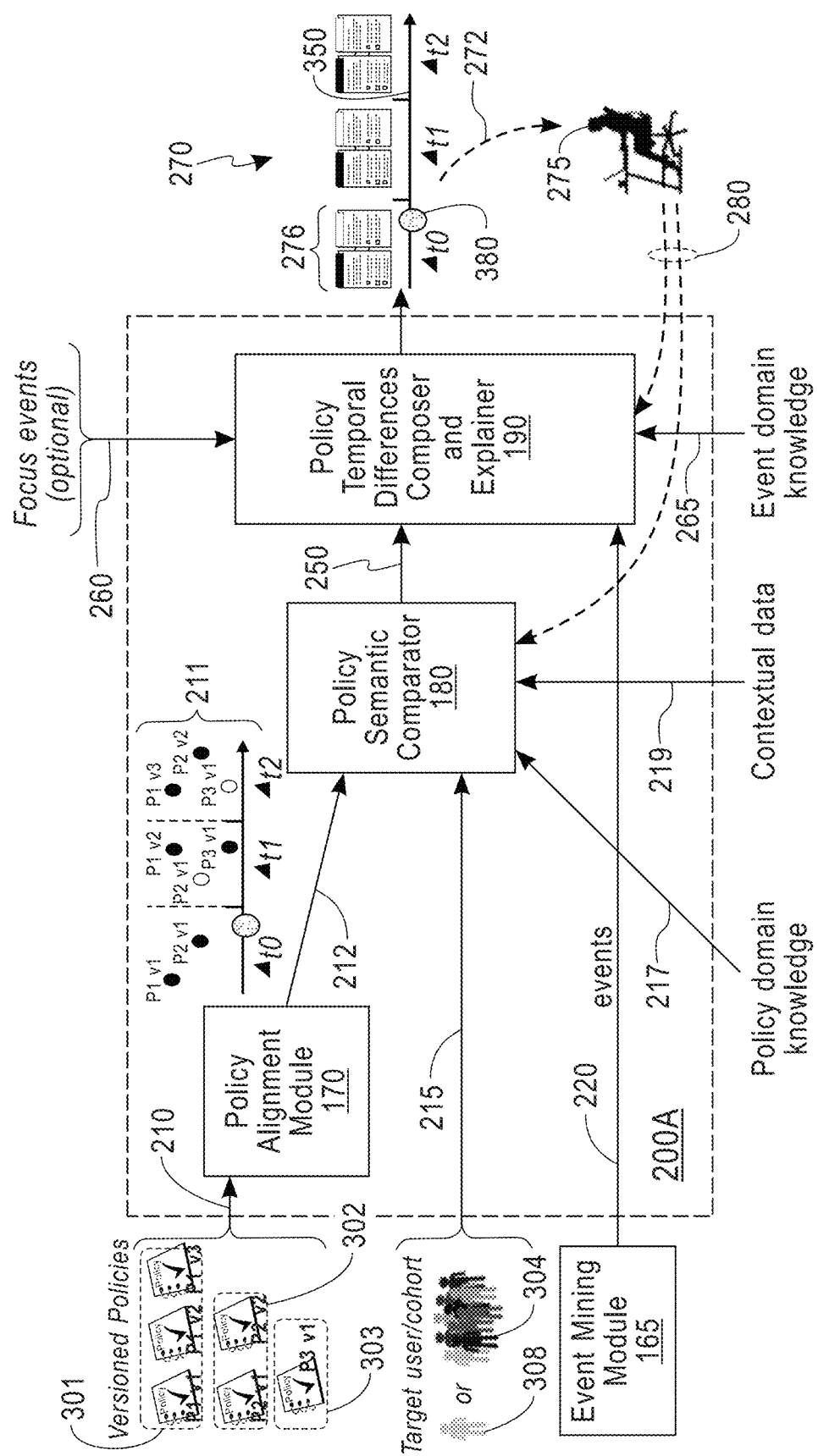
FIGS. 2A and 2B depict respective system block diagrams of respective first and second embodiments of a computer system for automatically suggesting legislative or policy changes across multiple dimensions according to embodiments of the present invention.

FIG. 2A depicts a system block diagram of a first embodiment of a system 200A run by computing system according to the supervisory program 110 for processing data to analyze and to explain determined temporal evolution of policies using the system tool of FIG. 1.

In FIG. 2A, in the first embodiment of the analysis and explanatory tool of the temporal evolution of policies, there is performed the receipt of input data 210 including a set of text documents or text passages each describing one or more policies to be compared at the policy alignment module 170. The set of policies data 210 in the input documents may be obtained by conducting a search via computer system 100, e.g., a keyword search in a particular knowledgebase. This input data 210 includes versions of policies associated with one or more jurisdictions. The policy alignment module 170 performs an aligning of the versioned policies 211 an alignment based on policy information, e.g., its stated topic or purpose, its service or action type and/or any time stamp information or other temporal features data relating to the issuance of the policy version. For each policy document, the policy alignment module 170 outputs an analysis 212 of the changes of the policy conditions (e.g., changes in a policy topic or purpose, its service or action type) over time across the different versions of the one policy document.

FIG. 3A shows an example application of the policy alignment module 170 when aligning several policies. In response to conducting a search, or whether user-specified policies are received input, there is obtained a first set 301 of versions of a policy P1 issued over time including a first policy P1 text version P1V1 305, a second policy P1 text version P1V2 306, and a third policy P1 text version P1V3 307. The approximate issuance times of each successive policy version P1V1 305, P1V2 306 and version P1V3 307 is shown within delta time intervals t0, t1, and t2. As shown in FIG. 3A, the policy alignment module 170 aligns several policies by first receiving or determining time intervals 351, 361, 371 shown along the alignment time line plot 350. For example, as shown in FIG. 3B, when comparing time stamps corresponding to their respective issuance times for changes/evolution of the same policy P1, e.g., policies P1V1, P1V2, P1V3 of set 301 these respective policies are binned according to time intervals 351, 361, 371. The length of time of each time interval 351, 361, 371 is configurable or user-specified.

As further shown in FIG. 3A depicting aligning of several policies by application of the policy alignment module 170, there is similarly obtained a second set 302 of versions of a policy P2 including a first policy P2 text version P2V1 315 and a second policy P2 text version P2V2 316 binned within respective delta time intervals 361, 371. A third policy P3 is obtained having a single text version P3V1 317 is shown binned within time interval 371.

Figure 6:
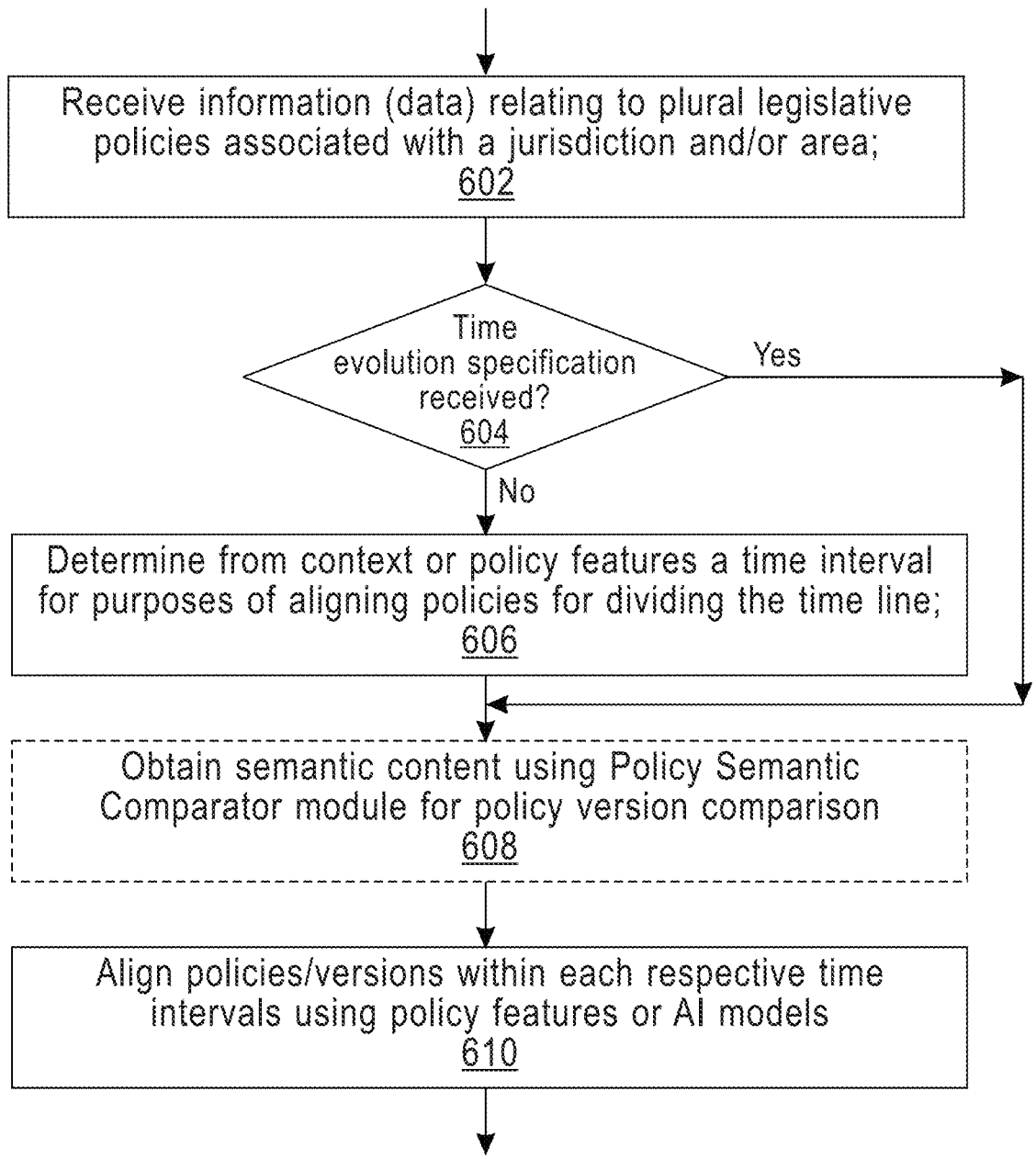
FIG. 6 shows an example automated method implemented for policy alignment at policy alignment module in an embodiment.

FIG. 6 shows an example automated method implemented 600 for policy alignment at policy alignment module 170. At a first step 602, there is received as input, one or policies (e.g, policies 301-303 of FIG. 3A) who's evolution of changes over time are to be compared. These policies are received as text (data) relating to plural legislative policies associated with a jurisdiction or areas. A keyword or natural language processing search may be used to obtain the relevant policy and versions thereof. As the alignment may be implemented by first determining preconfigured delta time intervals 351, 361, 371, etc. as shown in FIGS. 3A, 3B. The preconfigured time intervals 351, 361, 371 within which to bin the policies obtained from the search is shown along the alignment time line plot 350 indicating to which time interval a policy(ies) is(are) to be entered for purposes of comparison. The delta time intervals can each be equal in time length or vary in time, e.g., according to variable intervals computed according to an algorithm. Continuing at 604, FIG. 6 there is made a determination as to whether the system received as input a time evolution specification indicating a predetermined time span and/or a specification of a number and length of time intervals delineating relevant time periods within which policies are to be aligned for semantic comparison. For example, if such a time span/time line division scheme specification has been obtained, the method continues to 608. Otherwise, if no time evolution input specification has been received at 604, the method continues to 606 where a determination of a time interval delta/span for purposes of aligning policies is made based on relevant context including focus and/or events mined by the event mining module or policy features information. Then, the process returns to steps 608, FIG. 6.

In one embodiment, at step 608, the policy alignment module 170 can optionally obtain semantic content from text of each policy versions using Policy Semantic Comparator module for use in aligning policies versions within a time interval(s). For example, performed at step 608, FIG. 6, in a further embodiment, the policy alignment module 170 aligns the policies versions using an artificial intelligence (AI) system implementing machine-learned models that can take into account "focus events". For example, states in the United States do not publish changes at the same time, i.e., one state may implement a policy change: "schools closure" at the time t1 and another state may publish a change: "the schools have to reduce the number of students to X" at t2 (e.g., 2 months later) where both are caused by the focus event (e.g., a pandemic). Thus, the policy alignment module 170 may need information from policy semantic comparison to identify the time intervals for purposes of aligning these example state policies. In such an embodiment, as shown in FIG. 4, policy alignment module 170 obtains at 410 a semantic comparison of versions for each pair of policies (from Policy Semantic Comparator module 180), e.g., to identify the services/topics of changes and group them in a time interval at 415, based on the service/action type/topic/timestamp.

Returning to 610, FIG. 6, the module performs aligning of policies/policy versions to within respective time intervals using policy features or AI algorithms (e.g., transformers, deep neural networks) and NLP tools for alignment. Additionally, an algorithm based on semantic comparison of versions based on the focus event features can be employed for alignment. That is, in an embodiment, the policy alignment is driven by a focus event or another "important" event mined by external event mining module 160. For example, if a focus event is defined, alignment process would consist of a) sending different pairs of policies versions that are close on the time line (varying the version combinations) to the semantic comparator module along with focus event contextual data, and then b) based on the semantic comparison results, selecting the pairs of policies that suit most focus event features. Alignment may include obtaining the policy version every predetermined time period in the time line, or alignment may include obtaining the relevant policy versions for a period of time intervals before and after a time of a determined focus event occurrence. It is the case that a policy may not necessarily change in two or more consecutive time intervals.

An example policy alignment performed at step 610 is shown in the example depicted in FIG. 3A showing that while the initial first policy P2 version P2V1 315 was issued at or near time interval delta t1 such that the initial alignment of first policy version P2V1 315 is within time interval 361, according to comparison of an extracted policy feature(s) such as its service, action type, stated topic or purpose, it is determined that policy P2V1 can also align with first policy version P1V1 in time interval 351 given the importance of the received or specified delta time intervals for purposes of determining a temporal evolution over a time span. Thus, for better comparison of its content to the content of first policy P1 version P1V1 305, the alignment by policy alignment module 170 is performed by binning the content of existing first policy P2 version P2V1 315 as a new first policy P2 version P2V1 325 in first time alignment interval 351 including delta time interval t0. Similarly, while the initial first policy P3 version P3V1 317 was issued at or near delta time interval t2 such that the initial alignment of existing first policy version P3V1 317 is within time interval 371, according to its context or policy feature, e.g., stated topic or purpose, policy P3V1, can also align for content comparison purposes with the content of the second version of first policy P1, i.e., P1V2 306 and also existing policy P2V1 315 in time interval 361, given the importance of the given delta time intervals for purposes of determining a temporal evolution. Thus, the alignment performed by policy alignment module 170 performs aligning the existing first policy P3 version P3V1 317 to within the same interval of policy version P1V2 and P2V1 as new policy P3 version P3V1 327 in second time alignment interval 361 delta t1.

Whether aligning for comparing changes/evolutions of several policies (FIG. 3A) using a semantic comparison of versions for each policy, or for comparing changes/evolution of a single policy (FIG. 3B), the alignment time line plot 350 indicates a time of the event or focus event 380 which may be determined to have engendered each of the subsequent policy version changes within a span of successive time intervals.

Returning to system diagram of FIG. 2A, the output 212 of the policy alignment module 170 includes the set of policies to compare and their corresponding respective time intervals, with each policy potentially having several versions evolving over time as shown in a time line plot 350. This set of policies and time intervals is input to the policy semantic comparator module 180.

Additionally received as input to the policy semantic comparator module 180 is data 215 representing a relevant target user, e.g., a single user 302, a cohort of users 304, to which the policies and versions thereof are directed.

Additionally received as input to the policy semantic comparator module 180 is data 217 representing policy domain knowledge. The policy domain knowledge data 217 is data relevant to policies and versions thereof such as data from ontologies, knowledgebases, terminologies, and cost of services covered by policies, etc., relating to implementations of the policy/version(s). Further policy domain knowledge data 217 can include data related to the events, e.g., ontologies, Knowledge Graphs (KG), terminologies, rules, etc. and can include temporal background data, e.g. historical event records, descriptions, or domain knowledge associated with the events, that can assist in understanding the semantics of the policy or domain of the policy (e.g., auto insurance (car insurance domain), medical insurance domain, etc.)

Additionally received as input to the policy semantic comparator module 180 is any relevant contextual data 219 that can be used to explain any relevant policy changes. The relevant contextual data 219 can include data associated with the particular target user. For example, for the cohort (population), relevant contextual data 219 can include a claim and/or other operational data for the cohort, census and/or other statistical data describing population, e.g., of a state or a country. For a single user, relevant contextual data 219 can include claims, operational data, user profile, preferences, or other type of contextual data related to the user. Contextual data can include any further data relating to a user or cohort that permits semantic comparisons and temporal inferencing.

For policy comparison purposes, a focus event(s) is a description of an event(s) the system must focus on in addition to user/cohort contextual data when comparing the policies. Such events or focus events can include a natural disaster or a pandemic.

Figure 7:
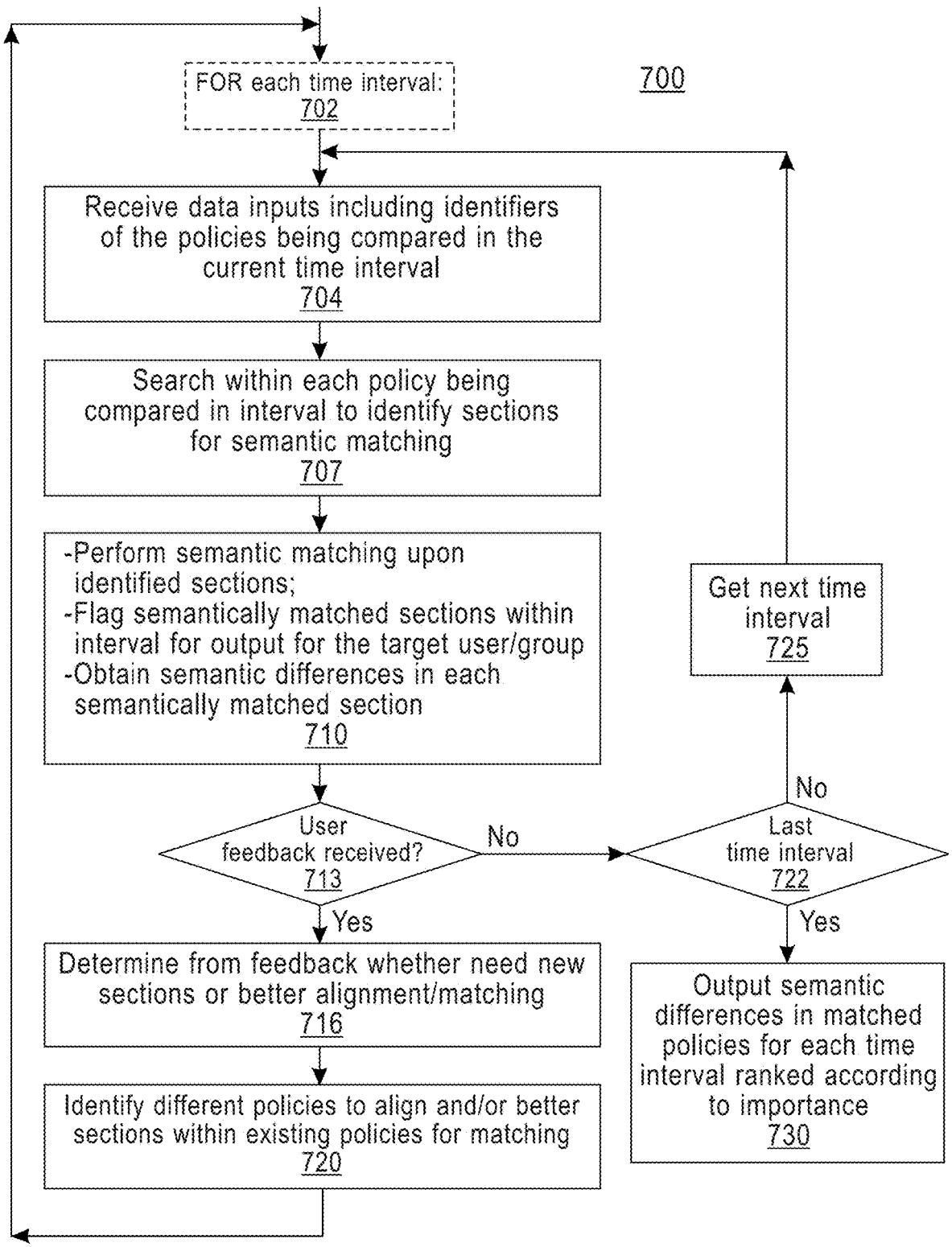
FIG. 7 shows an embodiment of an example automated method carrying out operations to semantically compare the policies aligned within each time interval in an embodiment.

FIG. 7 shows an embodiment of an example automated method 700 carrying out operations to semantically compare the policies aligned within each time interval of a temporal evolution time span. The steps of FIG. 7 are performed at each time interval 702 of a time span. At a first step 704, there is received the input data, e.g., policy domain knowledge, any relevant contextual data, any focus events, and the set of policies to compare, which may include identifiers of the particular policy and/or version thereof that has been aligned in the current time interval. Then, at 707, FIG. 7, there is performed a search within each policy being compared in the selected time interval to identify relevant sections for semantic matching. Once potential sections are identified, at 710 there is performed, at the NLP data processing tool 175, attempts to semantically match the identified sections. The matching may entail representing the identified policy sections as two graph-like structures (e.g., in a data base or ontology) and implement a matching operator which identifies those nodes in the two structures that correspond semantically to each other. For example, applied to policy, section or title, the operator can identify a word "wage" is semantically equivalent to another policy section indicating word "salary" because they are synonyms. This information may be taken from a lexical database.

In an embodiment, the policy semantic comparator module 180 at step 710 further compares the semantics of given policies conditions for a target cohort or an individual based on the contextual data. The comparison of the policies conditions is based on the semantics of the corresponding (policy) texts 211, and it is focused on the conditions that are relevant for a target cohort or an individual, based on using and understanding contextual data. The contextual data consists of features describing the target cohort or the individual. Such describing features may be collected from a variety of data sources including historical claim data, census data, e.g., for policies governing a population, personal profiles, medical records, e.g., claims data for policies governing car insurance domain, etc. . . . . The contextual comparison of policies conditions is associated with a human interpretable explanation of why such comparison/conditions are relevant/important for the given target cohort or individual, where the explanation is based on the semantics of the text describing the policies conditions and the contextual features of the target cohort or individual.

In an embodiment, the policy semantic comparator module 180 performs a semantic comparison between the text (policy) section inputs in each time interval. For example, returning to FIG. 3A, the policy semantic comparator module 180 contextually compares the semantics of policy P1V1 305 with aligned policy P2V1 325 aligned in time interval 351; contextually compares the semantics of policy P1V2 306 with aligned policy P3V1 327 aligned in time interval 361; and contextually compares the semantics of policy P1V3 307 with aligned policy P2V2 aligned in time interval 371. Further, as shown in FIG. 3B, the policy semantic comparator module 180 contextually compares the semantics of same policy P1, i.e., policies P1V1 305, version P1V2 306, and third policy version P1V3 307.

Finally, at 710, assuming the compared policy versions in the current time interval are semantically matched, those matched sections are flagged if of interest for the target user/group for output with the associated time interval. Those flagged policy sections can be further processed to determine the semantic differences for each policy in the current time interval to be output. Such processing includes employing the NLP tool 175 to create rules for semantically comparing the texts of two or more aligned policies in an interval, i.e., dependent upon information in the policy text, rules are used to make similarity comparisons. For example, such rules can be applied to determine whether the matched policy texts are directed to same policy conditions, or whether conditions have different values, e.g., a policy is to close a school vs. reduce numbers of students attending school.

Continuing at 713, FIG. 7, or at any time during or at the end of the analysis and temporal policy change evolution process, a determination can be made as to whether the system has received any user feedback regarding the choice of policy selections based on the matched sections. If there is negative user feedback received at 713, then the method proceeds to step 716 to determine from the feedback whether new policy/policy sections are needed for better or more accurate semantic alignment/matching. Then at 720, based on the feedback, there can be performed a realignment of the policies within the time intervals of the time frame, and/or the identification of different policies to search and align and/or identification of different sections within the existing policies for better matching, and or an identification of a different time interval lengths or span for determining policy evolution, and the process returns to step 702, FIG. 7 for repeating of the semantic matching steps in selected time intervals or all time intervals. The feedback received is also used to refine the ML models of the system and can be applied for both current comparison and for future comparisons.

Otherwise, if it is determined at step 713 that no user feedback has been received, then a determination is made at 722 as to whether the current time interval of the time span is the last time interval having polices for comparison. If the current time interval is the last time interval, then the next time interval of the time span is identified at 725, FIG. 7, and the process returns to repeat the semantic comparison steps 704-713.

Otherwise, at 722, if it is determined that the current time interval is the last time interval, then the process proceeds to step 730, where the policy semantic comparator module 180 outputs a set 250 of the semantic differences/changes between the aligned policies' versions matched in each time interval is output.

The method steps of FIG. 7 are repeated for each time interval of the specified or relevant time evolved span. Once all policies are semantically compared as determined at 722 in each of the relevant time intervals, at step 730, the process provides output of the policy differences to the next processing module. In an embodiment, the policy semantic comparator module 180 further performs at 730 a ranking by importance of the set of differences/changes between the policy versions in relation to the target user/cohort. Thus, the presented outputs shows the differences/changes ranked by importance in relation to the target user/cohort.

In an embodiment, after performing the contextual comparisons of the semantics of policies (versions) within each respective time interval(s), the policy temporal differences composer and explainer module 190 receives as input, the output set 250 of the semantic differences/changes between the aligned policies' versions and runs one or more of predictive models, regression models, KGs, neural networks, etc. to infer the link and causality of the changes in policy(ies) in time (between identified) semantic changes based on the events that have occurred around the time of change. In an embodiment, such a predictive model or like machine-learned model can be trained based on historical events data and how they have effected similar policy changes in the past.

Further received as input data 220 to the policy temporal differences composer and explainer module 190 from the data mining/ingestion module 165 is events data searched and obtained from a knowledgebase or the like. The events data 220 or focus event represent events that have occurred at such a time can be determined by the system as having been potentially a factor or the sole factor in triggering a relevant policy change(s) or policy version iteration of the received set of policies 210.

The policy temporal differences composer and explainer module 190 further receives mined events input data 220. For example, the data mining module 165 mines historical events from external data sources (e.g. Wikipedia, events knowledge graphs, etc.), and extracts important features for example using NLP tools it may extract events, features and relations and form a knowledge graph (KG), based on the events' domain knowledge (e.g. ontologies, KGs, models, etc.) and/or manually identified types, relations, etc.

In an embodiment, to obtain events, the modules, 180, 190 may implement event data mining techniques and algorithms as described in the book entitled "Event Mining: Algorithms and Applications" by Tao Li, CRC Press (2016) the contents and disclosure thereof being incorporated herein by reference. Mined event or event focus data includes a set of information including, but not limited to, one or more of: the relevant date/time, location, description, tags, number of participants, event duration, etc.

Optionally provided as inputs to the policy temporal differences composer and explainer module 190 are user-specified "focus events" 260. If a focus event is not specified, the system will work with events mined by event mining module.

Figure 8:
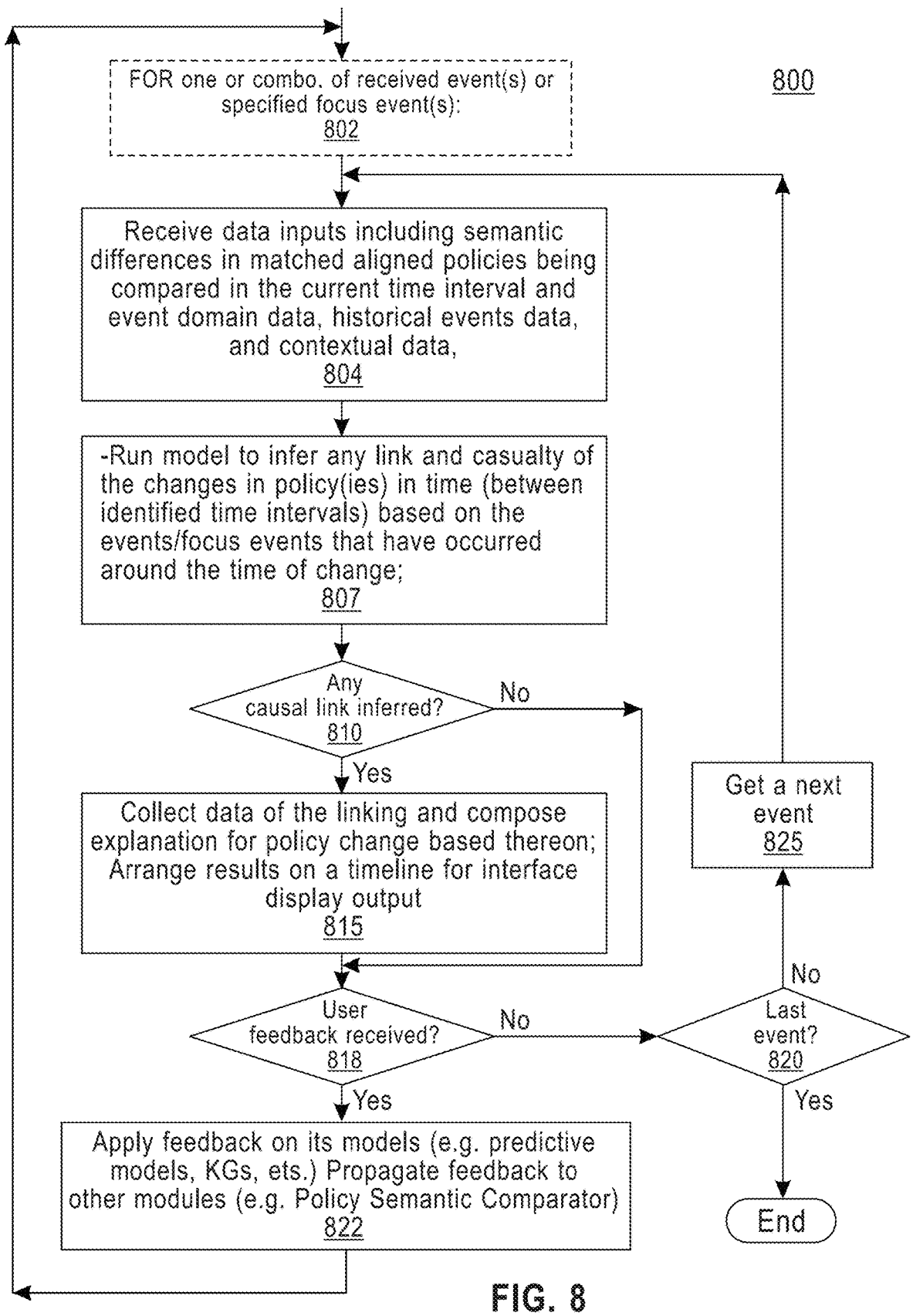
FIG. 8 shows an example automated method carrying out operations to compose and explain the reasons for policy change differences that have evolved over a temporal span in an embodiment.

FIG. 8 shows an automated method 800 carrying out operations to compose and explain the reasons for policy change differences that have evolved over a temporal span at policy temporal differences composer and explainer module 190. In an embodiment, the module receives as input a given mined event data or a user-specified "focus event" data used to determine whether specific policy changes are correlated (i.e., causal linked) to the occurrence of such events/focus event over time that may have impacted the changes. Thus, as indicated at 802, for one or a combination of received event(s) or focus event(s), the following steps are applied.

At step 804, there is received as input: the output set or passages 250 of the semantic differences/changes between the aligned policies' versions (e.g., doubles or triples) of one or more policies in each time interval. These semantic differences/changes between the aligned policies' versions are received as text (data) passages of the critical semantic content associated with the particular time interval. Additionally received at 804 is event domain knowledge relating to the current event/focus event. Event domain knowledge 265 obtained from ontologies, knowledgebases, terminologies, etc. and is used for event and policy changes feature extraction and linkage among them.

Continuing at 807, FIG. 7, there is made a determination whether a link or causality of the changes in policy(ies) in time (between identified time instances) can be inferred based on their relevance to the user/cohort and the events or focus events happening around the time of the change.

In an embodiment, the inferring whether there is a causal link between the changes (semantic differences) in policy (ies) in time (between identified time intervals) can include comparing the semantic changes in policy based on event/ focus event features if provided in the input. At 807, policy temporal differences composer and explainer module 190 can additionally receive historical events data that may have impacted policies as an input from the Event Mining Module 165 and the knowledge can be used to infer a possible link between the changes and those historical events. In one embodiment, to perform the inferencing and/or linking, the policy temporal differences composer and explainer module 190 semantically compares the event features and policy changes. Additionally, event domain knowledge such as e.g., ontologies, knowledge graphs, terminologies, etc. is used for determining causal linkage of events to policy changes. For example, a predefined set of domain knowledge rules can be applied that governs known specific types of events to specific policy changes. In such processing, a particular change can be caused by an event which may be determined as a background event, and however determined, for example, not applicable for a target user/cohort. These link inferences are used by the composer module 190 to set forth an explanation based on their relevance to the user/cohort, the explanation including, but not limited to: this policy change was caused by this event or focus event for a reason based on a particular rule or knowledge graph link, or because historical data shows a pattern of behavior or changes. Such types of predictive models are used to build up the explanations to identify events of the contextual data of the target user that has influenced the policy change.

Continuing to step 810, FIG. 8, for the current event and set of policy differences, a determination is made as to whether there is inferred any causal link between them that is relevant to the target user/group. If there is determined no causal link that is relevant, then the process proceeds to step 818 to determine whether any user feedback has been received that may impact the comparison/explanation results. Otherwise, if there is determined a causal link exists that is relevant, then the process proceeds to step 815 where module 190 performs collecting data of the linking and composing the explanation for policy change based thereon. The module then can present results on a timeline for interface display output before proceeding to step 818.

In an embodiment, the policy temporal differences composer and explainer module 190 arranges the composed collected data and explanations results on the timeline and displays it in a form of easily consumable by the end-user. For example, as shown in FIG. 2A, a set 276 of differences/ changes and explanations of the causality engendering the policy version change in relation to the target user/cohort is presented as output 270 and can be visualized in timed relation along a timeline 350. The explanation of changes over time is particularly causally linked (inferred) to either one or more of focus events 380 or other events happening around that time, or both, based on their relevance to the user/cohort. Evidences/explanations for each identified difference can be further augmented with relevant context data, e.g., an averaged cost of service (e.g., of a surgery as published by a state) or any other information that can be used to reflect/estimate and impact. For example, as shown in FIG. 2A, for each time interval the comparison of aligned policy versions based on the found context, is presented as shown over time, to depict an evolution of changes. The evolution of targeted features in the policy over time is visualized. The explanation of each comparison is provided relative to the focus event.

As the output 270 data including a visualization of explanations describing the causality or linking of events that have occurred at such a time to have triggered the relevant policy changes is presented in timed relation along a timeline 350 for visualizing 272 by a user 275, the user 275 can agree and accept that the comparison of the aligned policies (e.g., doubles or triplets) per time interval are correct or viable based on the policy features/context. The user 275 can also determine the correctness of the linking or causality found between the event and policy change for the particular policy or whether the mined event that was input was correct/relevant and provide this as feedback 280 into the system.

Thus, returning to step 818, FIG. 8, or at any time during or at the end of the analysis and temporal policy change evolution determining process, a determination can made as to whether the system has received any such user feedback. In an embodiment, feedback is provided by the user based on the analysis of the temporal evolution of policies, corresponding explanations and suggestions of the next actions. Feedback can be expressed in any form, such as an up-vote, down-vote, etc. If there is user feedback received at 818, then the method proceeds to step 822 to apply feedback on the system models (e.g. predictive models, regression models, KGs, neural networks, etc.) for refining those models, and further to propagate the user feedback 280 to other modules. For example, such propagated user feedback 280 can be feedback to Policy Semantic Comparator 180 of the system so that the policy comparison may be changed based on other or different policy features extracted, or different target user/cohort.

For example, at 822, based on the user feedback determining that a given mined event that was input was incorrect/irrelevant, there can be performed an identification of a different event(s)/focus event(s), and the process can return to step 802, FIG. 8 for repeating of the causal inference determining and composing/explaining steps for the new or different focus event.

Otherwise, returning to step 818, if it is determined that no user feedback has been received, then a determination is made at 820 as to whether any further focus events can be attempted for causal inferencing to specific policy changes. If there is no additional focus event for inference of linking, the process ends. Otherwise, if it is determined that there is additional focus events for inference linking, a next focus event is identified at 825, FIG. 8, and the process returns to repeat the causal linking and explaining steps 804-818 for the next identified event. The method steps of FIG. 8 are thus repeated for each input event/focus event.

Figure 2B:
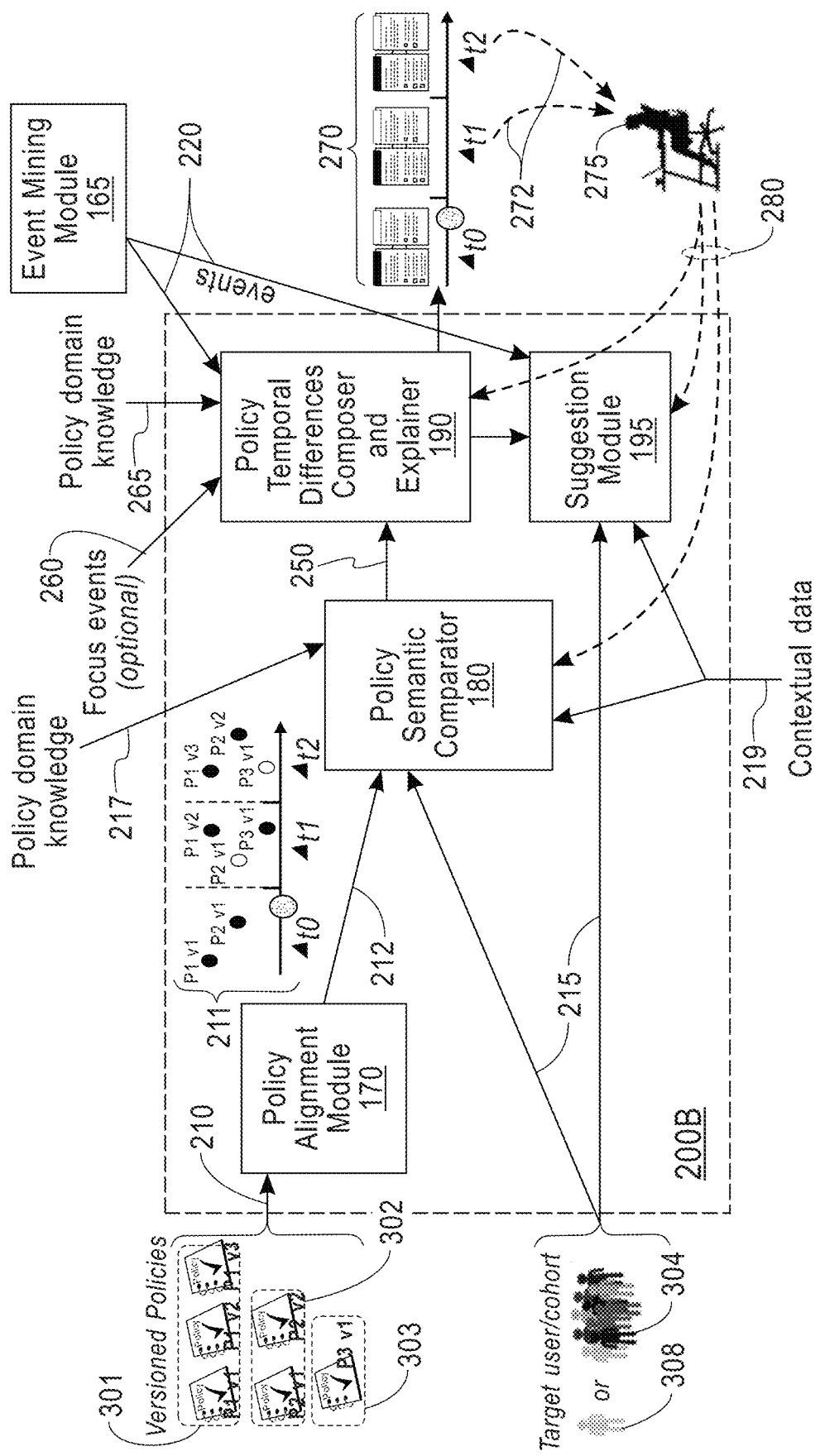

FIG. 2B depicts a further embodiment of the analysis and explanatory tool of the temporal evolution of policies method 200B implemented by computer system 100. The system 200B is similar to the system 200A of FIG. 2A in the respect of the functionality of policy alignment module 170, policy semantic comparator module 180 and policy temporal differences composer and explainer module 190. The system 200B of FIG. 2B further includes the suggestion module 195 that receives the target user/cohort data 215, the contextual data 219, the events data 220, and the output visualization data and explanations 270 describing the causality or linking of events to the relevant policy changes output from the policy temporal differences composer and explainer module 190 and feedback 280 from the user and processes this data using a recommender model to output any suggested next changes 290 for the policy of interest considering the target user/group. The suggestion module 195 uses a recommender model to receive the detected changes in the policies including the detected explanations as to why the change has happened, and based on that information, determine and output a suggestion such as a next most likely change to one policy. For example, for a current policy, the system looks at and compares similar policies from the past and corresponding detected changes that had happened and when, and thus the recommender model can build a suggestion(s) of such change(s) for a current model given a similar event/context.

The suggestion module 195 invokes a recommender system running a machine-learned recommender model and the features for the recommender model are extracted from contextual data and event data, depending on what impact the system targets to minimize or maximize (e.g., in a pandemic scenario: the impact on the lockdown vs. high immunity strategy on the number of deaths, the transmission rates, was it adopted by the public, etc.). In addition the suggestion module 195 captures user feedback 280 and applies it on its recommender models. Such user feedback 280 returned to the suggestion module 195 may be whether a particular next policy change suggestion is good or not good so as to refine the policy and refine the AI prediction.

Figure 5:
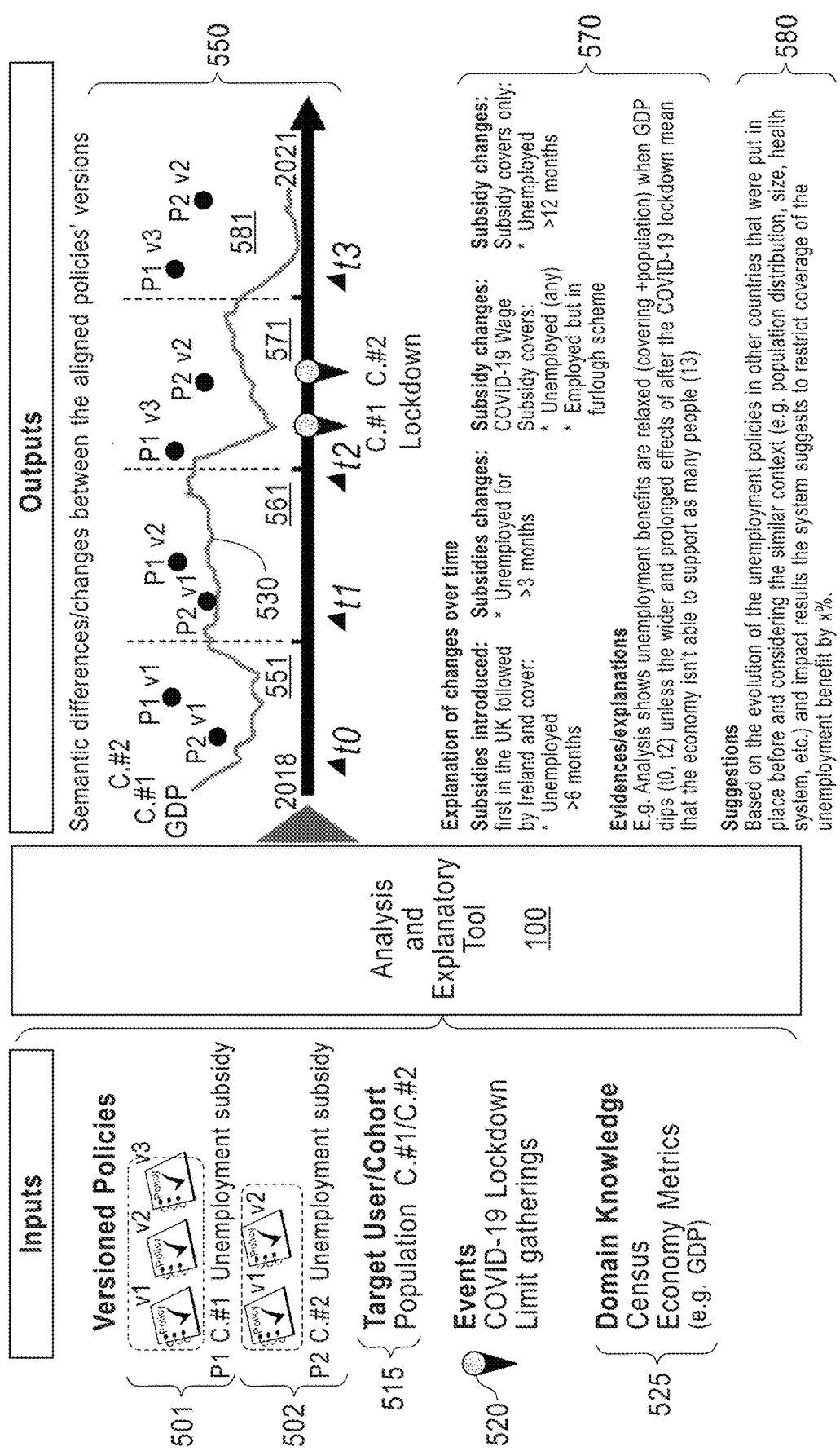
FIG. 5 shows an example application of the computer-implemented analysis and explanatory tool of temporal change policies according to an embodiment.

FIG. 5 shows an example application of the computer-implemented tool 100 for analysis and explanation of temporal change policies. In FIG. 5, the application of the analysis and explanatory tool of temporal change policies is for an example application to analyze and explain changes to wage and unemployment subsidies policies in force between 2018 and 2020 in two countries: Country #1 (C1) vs. Country #2 (C2). The input set of policies to compare may be obtained at a governmental web-site in each country. As shown, country C1 policy P1 on wage and unemployment subsidies 501 include a first, second and third versions P1V1, P1V2, P1V3 issued in respective time intervals 551, 561, 571 defined between time deltas t0-t1, t1-t2 and t2-t3. As shown in FIG. 5, country C1 policy P1V3 is issued in time interval 571 and is in effect at least through a further fourth time interval between times t3-t4. Further, in the example, country C2 policy P2 on corresponding wage and unemployment subsidies 502 includes a first and second version P2V1, P2V2. Country C2 policy P2V1 is in effect at least through successive time intervals 551 and 561, while country C2 policy P2V2 has issued in time interval 571 and is in effect through at least through the further fourth time interval 581.

Further, in the example the input target user 515 is a population of the respective countries C1, C2. Data mining module 165 has further detected a global pandemic event and resulting lockdown and closing of businesses and the limiting of gatherings. Alternatively, or in addition, a "focus event" specifying this information, e.g., a global pandemic event and resulting lockdown and closing of businesses, is entered by a user as input into the system. The analysis system will be oriented to focus on the input focus events in addition to user/cohort contextual data when the policies are being compared/explained.

In the example, the modules of the tool receive the contextual data associated with the target users (populations of country C1 and of country C2) and further can receive a context, e.g., an economy metric, e.g., the Gross Domestic Product (GDP), and the population count (census) of each of countries C1, C2. For the cohort (population), other operational data for the cohort, e.g., other statistical data describing the population of a state or a country can be input. For example, for a single user, contextual data may be claims, operational data, user profile information, preferences, or other type of contextual data related to the user.

As shown in FIG. 5, in the example, the policy alignment module 170 semantically compares and aligns versions of the policies as shown along timeline output 550. For example, within the 1 year time interval 551, text content such as the title, topic or indicated service or action of policies P1V1 and P2V1 are compared and are indicated as being aligned. Within the next year time interval 561, text content as the title, topic or indicated service or action of policies of P1V2 and P2V1 are aligned for subsequent semantic comparison purposes. Within the third year time interval 571, text content as the title, topic or indicated service or action of policies of P1V3 and P2V2 are compared and indicated as being aligned for subsequent semantic comparison purposes. Within the next year time interval 581, text content of policies of P1V3 and P2V2 are compared and deemed aligned for subsequent semantic comparison purposes.

As shown in FIG. 5, in the example, the policy semantic comparator module 180 receives the input focus events (either mined or entered by a user) and the module generates for visualization on time line 550 respective event focus time stamp indicator for country C1 and similarly for country C2. Further, the policy semantic comparator module 180 generates a list of semantic differences/changes between the aligned policies' versions in each corresponding time interval. From this depiction, an evolution of policy changes over the time period is created.

As shown in FIG. 5, in the example, the policy semantic comparator module 180 receives the domain context data 525, e.g., the GDP of each country C1, C2 and plots the combined GDP of each country C1, C2 along the Y-axis as a function 530 of the time (X-axis) spanning across all time intervals.

For the input example analyzing temporal changes in policies governing unemployment and wage subsidies over time, the detected semantic differences/changes between the aligned policies' versions P1V1, P1V1 in time interval 551 would reveal that subsidies were introduced first (as being closest to time t0) in country C2 followed by subsidies introduced in country C1, for a target cohort of individuals unemployed for a time greater than 6 months. The detected semantic differences/changes between the aligned policies' versions P1V2 in time interval 561 would reveal that subsidies introduced for the population in country C1 has changed to govern a target cohort of individuals having been unemployed for a reduced time greater than 3 months.

Further, the detected semantic differences/changes between the aligned policies' versions P1V3, P2V2 in time interval 571 would reveal the increase of wage subsidies in both countries C1, C2. Further semantic differences detected would reveal that the target cohort population subject to the new wage subsidy has changed to any unemployed individual, or individuals employed but in a furlough scheme.

Further, the detected semantic differences/changes between the aligned policies' versions P1V3, P2V2 in time interval 581 would reveal that the target cohort population subject to the new wage subsidy has changed to individuals unemployed for a time space greater than 12 months.

The policy temporal differences composer and explainer module 190 performs an analysis using a regression model to determine a causality that explains the reason for the unemployment subsidy changes indicated in the policy versions over time. For example, analysis at explainer module 190 shows unemployment benefits are relaxed when the GDP 530 dips (e.g., such as shown by the version changes found near time t0 in time intervals 551 and version changes detected near time t2 in time interval 571), unless the wider and prolonged effects of/after the COVID-19 lockdown mean that the economy is not able to support as many people such as shown in the time interval 581 beginning at delta time (t3). This is shown as evidences and explanations output 570 via a user interface display.

When configured according to the embodiment of the system 200B of FIG. 2B, for the example application depicted in FIG. 5, the suggestion module 195 performs an analysis using a recommender system model to determine suggestions based on the comparisons over time. Given the example depicted in FIG. 5, the system 100 may suggest that "based on the evolution of the unemployment policies in other countries that were put in place before, and considering the similar context (e.g. population distribution, size, health system, etc.) and impact results, the system can suggest to restrict coverage of the unemployment benefit by x %" as shown as a suggestion output 580 via a user interface display.

In embodiments, the tool 100 could be used as part of a portal, chatbox or FAQs to explore the evolution of policy across multiple programs, state policies, federal policy in response to an event or a crisis. For example, the present invention can be implemented as a post-crisis follow up and after-action review of the responses carried out during the crisis to understand lessons learned, and feedback into the preparation stage for future emergency responses. In addition, the system tool supports policy makers on the planning next steps to prevent and/or have an earlier response to reduce the impact to an event.

The system tool 100 can also provide suggestions based on understanding and explaining past policy changes and their impact for similar context, or by comparing policies from other states/countries that implemented before changes in policy in response to same or similar event (e.g., a previous pandemic, in preparation for a global recession, etc.) and based on receipt of the context associated with any policy changes effects. Further another knowledgebase or databases may be mined to determine the occurrence of an event(s) has taken place of such meaningful influence to have affected an area(s) or a target group(s) of people and that engendered a particular policy change.

In this manner, policy makers can better understand how similar policies or policies in other countries/other domains have changed over time and explain why these changes had occurred at the particular time. This information, can be used to suggest how policies they control can change, e.g., if similar types of events happen, or based on contextual data common to what prefaced prior policy changes.

Figure 9:
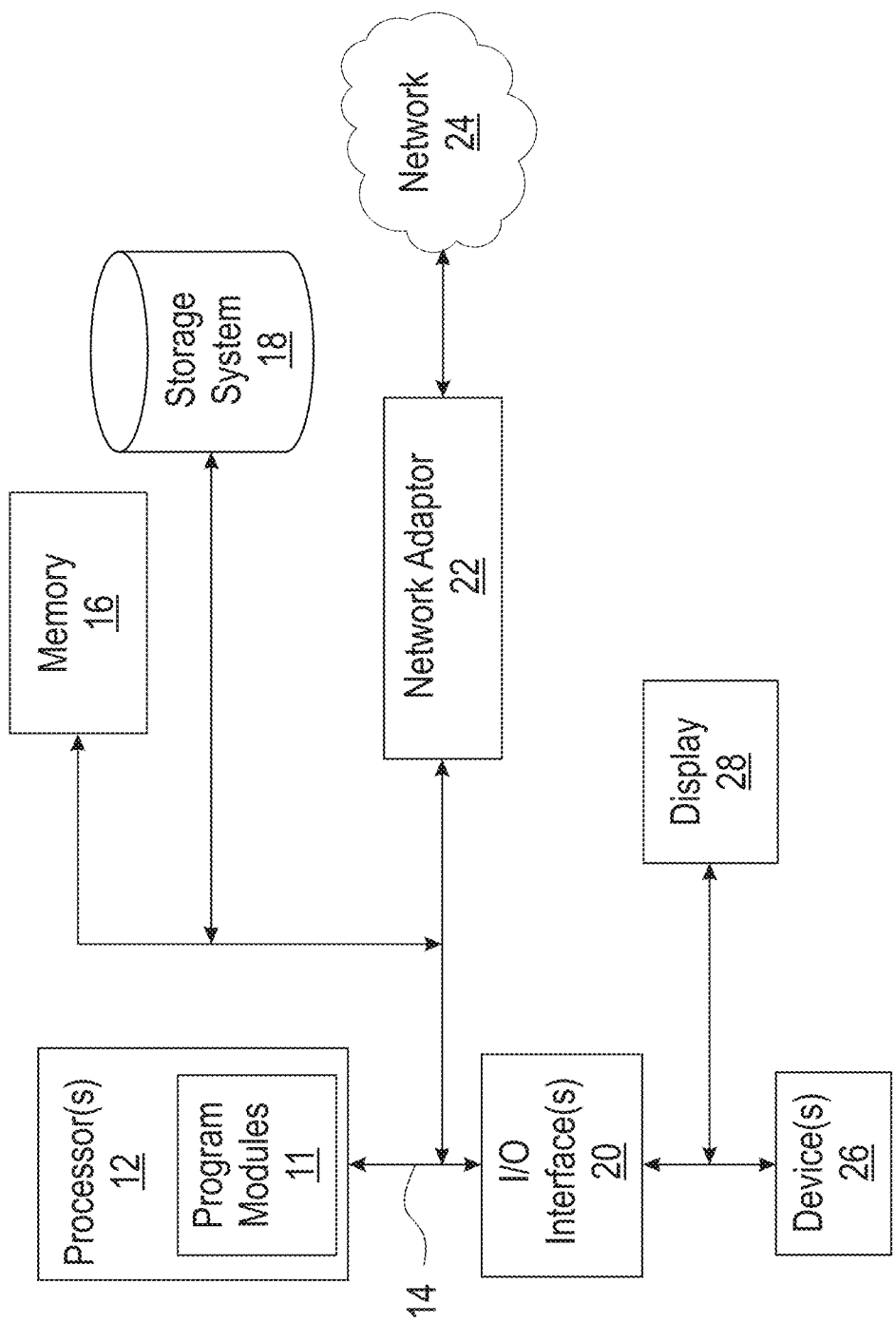
FIG. 9 illustrates a schematic of an example computer or processing system according to embodiments of the present invention.

FIG. 9 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIGS. 6-8).

The components of the computer system may include, but are not limited to, one or more processors or processing units 12, a memory 16, and a bus 14 that operably couples various system components, including memory 16 to processor 12. In some embodiments, the processor 12 may execute one or more modules 11 that are loaded from memory 16, where the program module(s) embody software (program instructions) that cause the processor to perform one or more method embodiments of the present invention. In some embodiments, module 11 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
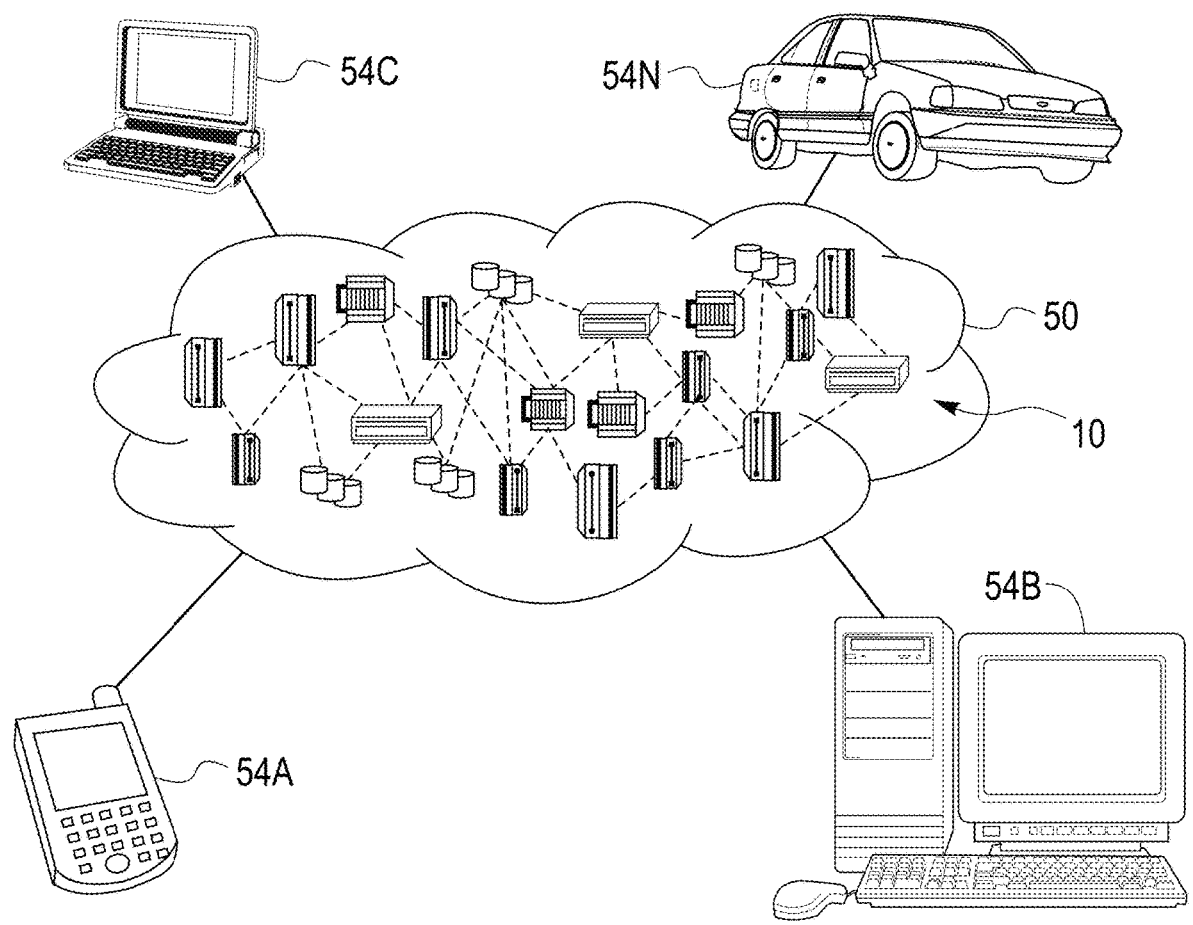
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
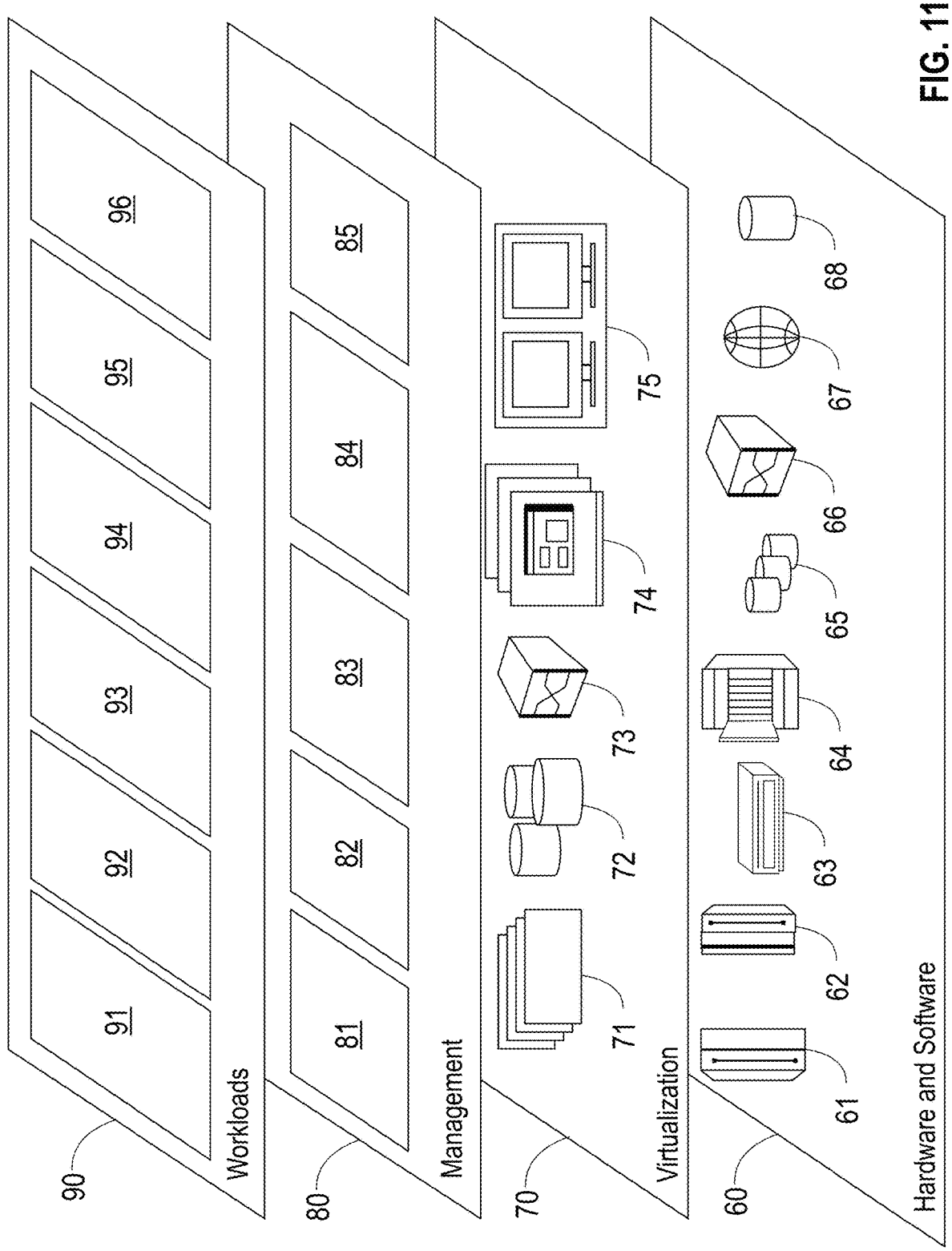
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 to automatically analyze and explain temporal evolution of policies according to aspects of the present disclosure.

What is claimed is:

1. A computer-implemented method of automatically generating policy for governing an entity, said method comprising:

receiving, by a hardware processor, textual content associated with one or more policies over a period of time, the one or more policies comprising different versions of a policy governing an individual or cohort or population type over the time period;

comparing, by the hardware processor, text content of at least two policy versions over a given time frame;

determining, by the hardware processor, based on said comparing, semantic differences between said text content of said at least two policy versions that amount to changes of said at least two policy versions over the period of time;

receiving, by the hardware processor, one or more focus events potentially effecting the individual or cohort type over the given period of time;

determining, by the hardware processor, based on said semantic differences, a causal link explaining a reason for the changes between the at least two policy versions in the context of a focus event; and presenting, by the hardware processor, an explanation or reason for the changes via a user interface device.

2. The computer-implemented method of claim 1, further comprising:
using the explanation or reason as a recommendation to prospectively change a condition of an existing policy in anticipation of a future occurring event.

3. The computer-implemented method of claim 1, further comprising:
receiving, by the hardware processor, contextual data relating to the at least two policy versions, said contextual data providing context for said explanation or reason for the changes.

4. The computer-implemented method of claim 1, further comprising:
determining, by the hardware processor, a number of time intervals and a time duration of each time interval over the given time frame; and determining, for a time interval, one or more said different policy versions to be compared.

5. The computer-implemented method of claim 4, further comprising:
identifying, by the hardware processor, a content of each said different policy version; and
aligning, by the hardware processor, different policy versions within a given time interval based on said identified content.

6. The computer-implemented method of claim 1, further comprising:
using, by the hardware processor, natural language processing (NLP) to perform semantic analysis to determine, from said at least two policy versions, said semantic differences.

7. The computer-implemented method of claim 1, further comprising:
running, by the hardware processor, a machine-learned predictive model for inferring, based on said semantic differences, a causal link between a change between the at least two policy versions between identified time intervals, and one of: a focus event or a particular domain context occurring around the time of the change.

8. The computer-implemented method of claim 7, further comprising:
training, by said hardware processor, said machine-learned predictive model based on historical events data and how they have effected similar policy changes in the past.

9. A computer-implemented system for automatically generating policy for governing an entity, the system comprising:

a memory storage device for storing a computer-readable program, and at least one processor adapted to run said computer-readable program to configure the at least one processor to:

receive textual content associated with one or more policies over a period of time, the one or more policies comprising different versions of a policy governing an individual or cohort or population type over the time period;

compare text content of at least two policy versions over a given time frame;

determine, based on said comparing, semantic differences between said text content of said at least two policy versions that amount to changes of said at least two policy versions over the period of time;

receive one or more focus events effecting the individual or cohort type over the given period of time;

determine based on said semantic differences, a causal link explaining a reason for the changes between the at least two policy versions in the context of a focus event; and present an explanation or reason for the changes via a user interface device.

10. The computer-implemented system of claim 9, wherein the at least one processor is further configured to:
use the explanation or reason as a recommendation to prospectively change a condition of an existing policy in anticipation of a future occurring event.

11. The computer-implemented system of claim 9, wherein the at least one processor is further configured to:
receive contextual data relating to the at least two policy versions, said contextual data providing context for said explanation or reason for the changes.

12. The computer-implemented system of claim 9, wherein the at least one processor is further configured to:
determine a number of time intervals and a time duration of each time interval over the given time frame;
determine, for a time interval, one or more said different policy versions to be compared;
identify a content of each said different policy version; and
align different policy versions within a given time interval based on said identified content.

13. The computer-implemented system of claim 9, wherein the at least one processor is further configured to:
use natural language processing (NLP) to perform semantic analysis to determine, from said at least two policy versions, said semantic differences.

14. The computer-implemented system of claim 9, wherein the at least one processor is further configured to:
run a machine-learned predictive model for inferring, based on said semantic differences, a causal link between a change between the at least two policy versions between identified time intervals, and one of: a focus event or a particular domain context occurring around the time of the change, said predictive model trained based on historical events data and how they have effected similar policy changes in the past.

15. A computer program product, the computer program product comprising a computer-readable storage medium having a computer-readable program stored therein, wherein the computer-readable program, when executed on a computer including at least one processor, causes the at least one processor to:
receive textual content associated with one or more policies over a period of time, the one or more policies comprising different versions of a policy governing an individual or cohort or population type over the time period;

compare text content of at least two policy versions over a given time frame;

determine, based on said comparing, semantic differences between said text content of said at least two policy versions that amount to changes of said at least two policy versions over the period of time;

receive one or more focus events effecting the individual or cohort type over the given period of time;

determine based on said semantic differences, a causal link explaining a reason for the changes between the at least two policy versions in the context of a focus event; and present an explanation or reason for the changes via a user interface device.

16. The computer program product of claim 15, wherein the computer readable program further configures at least one processor to:

use the explanation or reason as a recommendation to prospectively change a condition of an existing policy in anticipation of a future occurring event.

17. The computer program product of claim 15, wherein the computer readable program further configures at least one processor to:

receive contextual data relating to the at least two policy versions, said contextual data providing context for said explanation or reason for the changes.

18. The computer program product of claim 15, wherein the computer readable program further configures at least one processor to:

determine a number of time intervals and a time duration of each time interval over the given time frame;

determine, for a time interval, one or more said different policy versions to be compared;

identify a content of each said different policy version; and align different policy versions within a given time interval based on said identified content.

19. The computer program product of claim 15, wherein the computer readable program further configures at least one processor to:

use natural language processing (NLP) to perform semantic analysis to determine, from said at least two policy versions, said semantic differences.

20. The computer program product of claim 15, wherein the computer readable program further configures at least one processor to:

run a machine-learned predictive model for inferring, based on said semantic differences, a causal link between a change between the at least two policy versions between identified time intervals, and one of: a focus event or a particular domain context occurring around the time of the change, said predictive model trained based on historical events data and how they have effected similar policy changes in the past.

* * * * *